Figure 1:
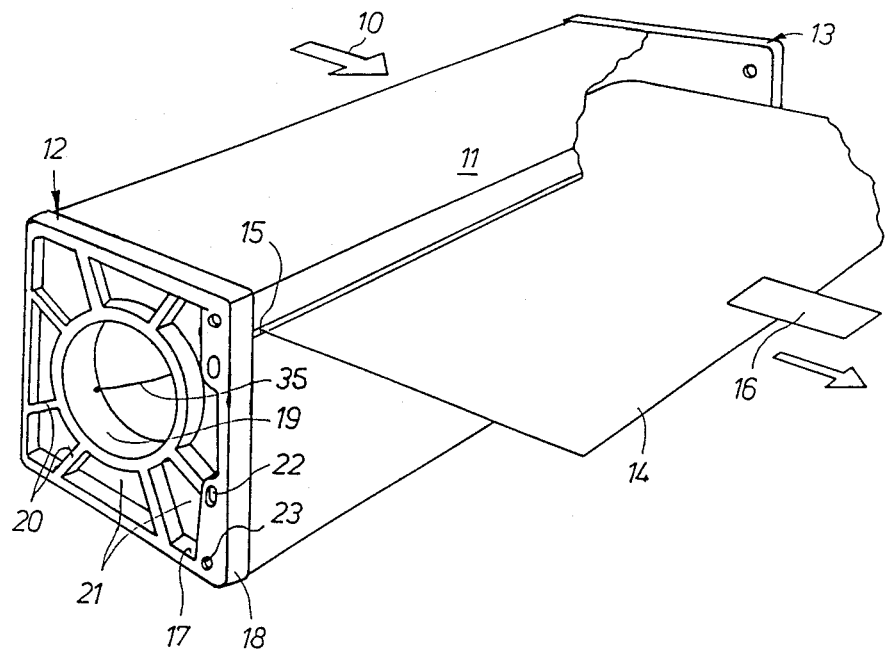

United States Patent [19]

Buelens et al.

[11] Patent Number: 4,834,236

[45] Date of Patent: May 30, 1989

[54] LIGHT-TIGHT CASSETTE AND METHOD FOR PACKING ROLLS OF LIGHT-SENSITIVE MATERIAL IN A CASSETTE

[75] Inventors: Edward Buelens, Kontich; Jozef E. Mostmans, Beerse, both of Belgium

[73] Assignee: Agfa-Gevaert N.V., Mortsel, Belgium

[21] Appl. No.: 265,339

[22] Filed: Oct. 24, 1988

Related U.S. Application Data

[63] Continuation of Ser. No. 16,063, Feb. 18, 1987, abandoned.

[30] Foreign Application Priority Data

Sep. 5, 1987 [EP] European Pat. Off. ........... 86201526

[51] Int. Cl.⁴ ...................... B65D 81/18; G03B 17/26
[52] U.S. Cl. ................................. 242/71.1; 206/408; 206/409; 354/275
[58] Field of Search ........ 206/316, 389, 397, 406–409, 206/415; 242/55.2, 55.53, 68.4, 68.5, 71, 71.1, 71.7, 71.8, 71.9, 75.4, 197; 354/275

[56] References Cited

U.S. PATENT DOCUMENTS

| | | | |
|---|---|---|---|
| 1,049,281 | 12/1912 | Sylvester | 242/71.9 |
| 1,664,730 | 4/1928 | Beidler | 242/71.1 |
| 2,153,573 | 4/1939 | Kinloch | 242/71.1 |
| 2,429,355 | 10/1947 | Goldschmidt | 242/71.8 |
| 2,566,267 | 8/1951 | Wallace | 242/71.1 |
| 3,645,385 | 2/1972 | Bushnell | 206/409 |
| 4,221,479 | 9/1980 | Harvey | 242/71.1 |
| 4,407,579 | 10/1983 | Huff | 242/71.1 |
| 4,514,070 | 4/1985 | Norris | 354/275 |

FOREIGN PATENT DOCUMENTS

| | | | |
|---|---|---|---|
| 1221013 | 5/1960 | France | 242/71.1 |
| 1236361 | 6/1960 | France | 242/68.4 |
| 1086493 | 10/1967 | United Kingdom | 354/275 |

OTHER PUBLICATIONS

"Core Locking Device for Web Dispensing Cassette", Lehmann et al., *Research Disclosure*, No. 16352, 11-1977, 354–275.

*Primary Examiner*—Jimmy G. Foster
*Attorney, Agent, or Firm*—William J. Daniel

[57] ABSTRACT

A light-tight cassette for holding and dispensing a roll of light-sensitive material wound onto a core, wherein the core is provided with extension members for lengthening the core whereby cassettes of a given length can be used with rolls of variable width.

7 Claims, 3 Drawing Sheets

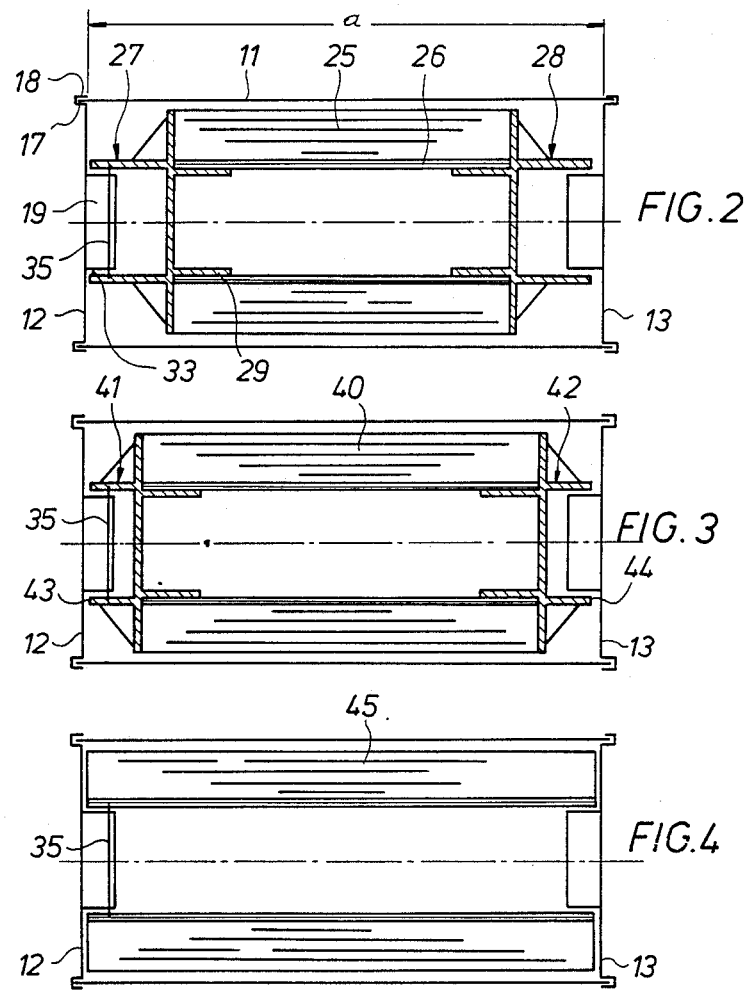

LIGHT-TIGHT CASSETTE AND METHOD FOR PACKING ROLLS OF LIGHT-SENSITIVE MATERIAL IN A CASSETTE

This application is a continuation of application Ser. No. 16,063, filed Feb. 18, 1987, now abandoned.

DESCRIPTION

The present invention relates to a light-tight cassette for holding and dispensing a roll of light-sensitive material, and to a method of packing rolls of light-sensitive material in a cassette.

Light-tight cassettes, cartridges or magazines (hereinafter called "cassettes") for holding and dispensing a roll of light-sensitive photographic material are known, which are in the form of a box comprising a shell with end closure walls and hub means for rotatably supporting the roll within the box, the shell having a light-tight peripheral exit slot extending between the two end walls through which light-sensitive material can be drawn from the roll.

These cassettes are used in reprographic cameras for the production of copies from originals that are placed on the copy board of the camera. Modern cameras are not only provided with microprocessor control for the exposure time, the enlargement setting, the film transport, etc., but also with format sensing means in those cases where the camera is arranged for operating with different widths of light-sensitive film. There are cameras that use one cassette for different widths of light-sensitive film. The light-sensitive film is wound onto a core which is rotatably supported on the hub means of the cassette. The widest film occupies the full length of the core and the film roll is laterally supported by the inner surfaces of the end walls of the cassette. The narrower film types are centrally wound on the same core as the widest film type, but the film roll is laterally supported by cylindrical spacers that are slid over the core on both sides of the film roll.

The latter procedure suffers from different disadvantages. First, the common winding machines that are used in the manufacturing process need modifications in order to be suited for the winding of films that are less wide than the core onto which they are wound.

Further, the lateral support which is offered by the separate spacers causes difficulties as the film roll is almost completely unwound, since it has been found that the last roll windings which became nearly tension-free as the roll is nearly exhausted, may become laterally displaced and clamped between the core and the inner wall of a spacer so that the filmroll becomes jammed and film lengths of several meters may be lost.

It is the object of the present invention to provide an improved cassette for holding and dispensing rolls of light-sensitive material having different widths, which can be manufactured readily and which enables also the last part of a film roll to be unwound without any risk of the film being subjected to jamming or increased pulling forces.

It is a further object of the invention to provide an improved cassette of the type referred to, which readily lends itself to the incorporation of a suitable locking system for locking the film roll against rotation prior to the first use of the cassette.

According to the present invention, a light-tight cassette for holding and dispensing a roll of light-sensitive photographic material wound onto a core, said cassette being in the form of a box comprising a shell with two end closure walls and hub means for rotatably supporting a said roll within the box, the shell having a light-tight peripheral exit slot though which light-sensitive material can be drawn from said roll, is characterized in that the core is a tubelike member with a length smaller than the distance between the inside surfaces of the end closure walls, at least one end of the core is provided with a separate extension member that is connected to the core, the free end of said member being in rotational engagement with the hub means of the corresponding end closure wall, and the extension member has a radial flange which is in contact with the corresponding end of the roll of light-sensitive material.

The advantage in the use of the light-tight cassette as described above resides in the fact that the radial flange, which makes part of the extension member, is attached to the core so that it is impossible for the last roll windings to get jammed between the core and the member that provides lateral support for the roll.

The core of a cassette in accordance with the invention may be provided with one extension member only so that the roll of light-sensitive material will take an assymetric position in the cassette, but the core is preferably provided with two equal extension members so that the light-sensitive material will take a central position in the cassette.

The invention includes also a method of packing roll of light-sensitive material of variable width, in one cassette.

According to the invention, a method of packing roll of light-sensitive material wound onto a core, in a light-tight dispensing cassette which has a peripheral exit slot through which the material can be pulled from the cassette, is characterized in that roll of light-sensitive material of variable width is used in cassettes of the same width, the roll of photographic material having a width corresponding with the length of the core, the core of the widest roll being directly rotatable on hub means on the end walls of the cassette, and the core of the narrower roll or rolls being provided with tubular extension means rotatably fitting on hub means of the corresponding end wall of the cassette, and the extension means being provided with flange means for lateral support of the roll of wound material.

Figure 5:
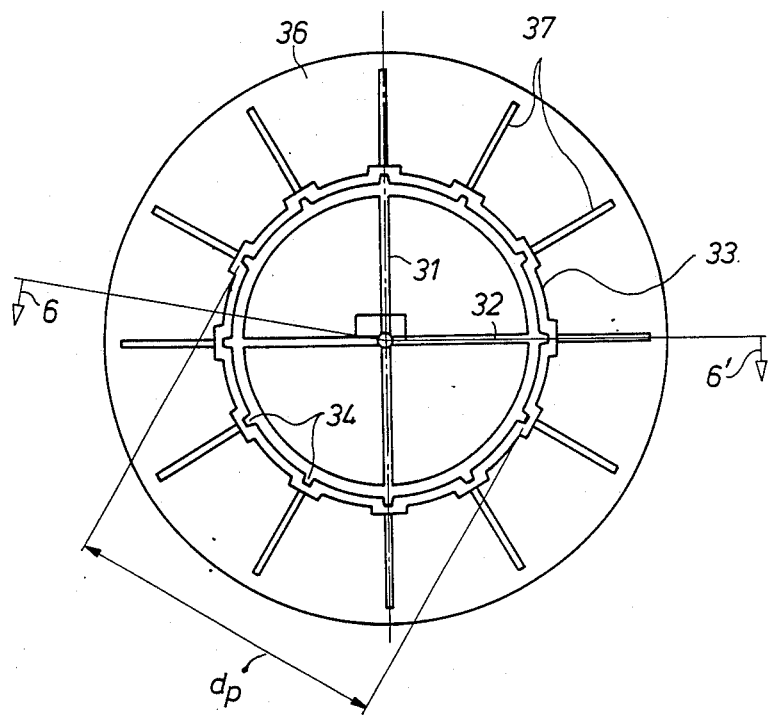
Figure 6:
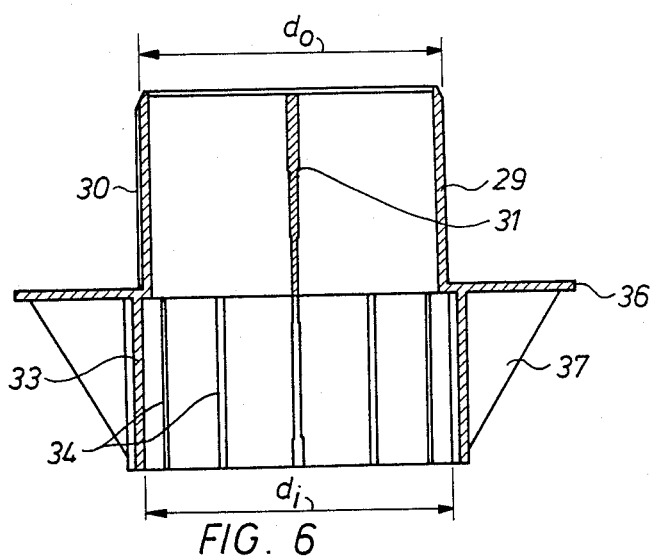

The invention will be described hereinafter by way of example with reference to the accompanying drawings in which:

FIG. 1 is a perspective view of one embodiment of a cassette in accordance with the invention, FIG. 2 is a diagrammatic longitudinal sectional view of the cassette of FIG. 1, loaded with a narrow roll of film, FIG. 3 is a diagrammatic longitudinal sectional view of the cassette of FIG. 1, loaded with a wider film, FIG. 4 is a diagrammatic longitudinal sectional view of the cassette of FIG. 1, loaded with a usual roll of film, FIG. 5 is a plan view of the extension member used in the cassette according to FIG. 2, and FIG. 6 is a section on line 6—6' of FIG. 5.

Referring to FIG. 1 which is a perspective view, partly broken away, of one embodiment of a cassette according to the present invention for holding a roll of light-sensitive material, the cassette which is generally indicated by the arrow 10, comprises a tubular shell 11 and two end closure walls in the form of end caps 12 and 13. A web 14 of light-sensitive material can be drawn from a roll inside the cassette, through a light-tight exit slot 15. The leading end of the web is provided with a piece of self-adhesive tape 16 by means of which it is attached to the shell of the cassette prior to the first use of the cassette.

The shell of the illustrated cassette has a box-type shape and may be manufactured from cardboard, from metal, or from plastics, preferably by extrusion moulding.

The end caps 12 and 13 are preferably made from plastic, for example by vacuum- or injection moulding. The end caps may be fastened to the shell by any known technique such as glueing, welding, taping or stapling.

Each end cap comprises inner and outer peripheral wall portions 17 and 18 that define a peripheral groove at the innerside for receiving an end of the shell. Each end cap has further a hollow hub portion 19 which is formed by a central portion upset from the end wall. The hub portion is connected with the periphery of the end cap by radial ribs 20. The recessed wall portions 21 between the ribs provide with their inside surface a lateral support for the roll of light-sensitive material in the cassette. The distance a between the innerside surfaces of the opposed end caps, corresponds practically with the length of the exit slot 15 (see FIG. 2). The cassette may optionally be provided with light-tight cavities such as 22 and 23 that may co-operate with fixation pins of a dispenser mechanism with web pulling rollers, that may be clamped on the cassette near the exit slot for the removal of the web from the cassette. Suchlike dispenser mechanism is disclosed in U.S. Pat. No. 4,052,731 with the title: "Filmcassete for a camera".

Further details about the construction of the mantle and the end caps of a cassette in accordance with the present invention may be found in U.S. Pat. No, 4,068,247 and U.S. Pat. No. 4,291,802, entitled: "Light-tight cassette".

The longitudinal sectional view of FIG. 2 illustrates the cassette of FIG. 1, loaded with a roll of web that is notably narrower than the basic roll width used in the cassette. In the present example of FIG. 2, the illustrated cassette is a 12" type cassette and roll 25 of film has a width of 8½".

The film roll 25 is wound on a hollow core 26 which is in the form of an elongated hollow cylinder and which may be made from cardboard, plastic or the like. The core is provided with two identical extension members 27 and 28 which are illustrated in detail in FIGS. 5 and 6. The extension members are preferably made from plastic by injection moulding. Suitable plastics are polystyrene, ABS, polypropylene, polyethylene or PVC. Each extension member comprises a first, generally tubular section 29 with an outer diameter $d_o$ such that it tightly fits into the core 26, and a second tubular section 33 with an inner diameter $d_i$ which is equal to the inner diameter of the core.

The section 29 has small longitudinal ribs 30 at its outer peripheral surface that provide an additional clamping effect of the member in the core 26. In its interior, the section is reinforced by radial ribs 31, 32 in crosslike form, see FIG. 5.

The second section 33 is provided at its inner peripheral wall with a plurality of axial grooves 34 at diametrically opposite positions, and that have a depth of several millimeters. The purpose of these grooves is to co-operate with a locking pin 35 as illustrated in FIGS. 1 to 4. This locking pin is a flexible steel wire with a diameter of approximately 1 mm that has a length that is slightly smaller than the distance $d_p$ between the bottoms of two opposed locking grooves as indicated in FIG. 5. The purpose of this pin is to lock the roll of light-sensitive material against unwinding during transport and handling of the cassette since partial unwinding causes a reduction of the winding tension of the wound film whereby the film windings may become free to rub over each other and/or to increase in diameter whereby they may even enter in contact with the inner surface of the shell of the cassette and acquire a shape that may hinder or completely prevent the withdrawal of the film from the exit slot. The operator pulls the pin from the cassette prior to the first operation of the cassette by slightly flexing the pin.

Finally, the extension member has a circular radial flange 36 which is situated between the two described sections 29 and 33 and which has a diameter at least equal to the outer diameter of the film roll 25. The flange is stiffened by angularly spaced triangular ribs 37 which connect the flange with the section 33.

The two extension members 27 and 28 ensure a perfect axial centering of the film roll in the cassette so that no exterior lateral guides are required for keeping the film on the required path while exiting from the cassette.

The pull-out force of the film from the cassette was slightly less than in the case of a cardboard core that was directly journalled on the hubs of the end caps. This is due to the reduced friction between the plastic extension members and the hubs.

The loading of a cassette in the manufacturing process, may occur as follows. The operator manually inserts a roll of film into an open cassette which has been provided at one side with an end cap, while taking care that a leading section of the film protrudes through the exit slot of the cassette, and then places the second end cap and attaches it to the shell.

The loaded cassette is further finished under daylight conditions. A locking pin 35 is slightly bent, inserted through the two opposite holes in the hub, and then released. The odds for the pin to immediately engage two corresponding grooves 34 of the extension member is very small, and for that reason the operator gently pulls the leading film end until after at most some tens of degrees of rotation, the pin ends spring in corresponding grooves. The leading film end is attached by a strip of self-adhesive tape 16 to the shell of the cassette, an identification label is stuck to the shell and the cassette is then ready for being packed in a light-tight and damp-tight wrapping, and next in a packaging carton.

FIG. 3 illustrates a larger roll of photographic film which is rotatably journalled in the same cassette as the one illustrated in FIG. 2.

The extension members 41 and 42 are similar to the members 27 and 28 described above, except for the outer sections 43 and 44 which are shorter conforming to the greater width of the film.

FIG. 4 illustrates the cassette of FIGS. 2 and 3, loaded this time with a conventional roll 45 of film, the core and the roll ends of which are in lateral, sliding supporting contact with the inside surface of the end caps 12 and 13.

In the present examples, the respective film widths were 8½", 10" and 12" for the cassettes of FIGS. 2, 3 and 4.

It will be understood that a cassette according to the present invention is not limited to the described examples.

A cassette according to the invention may be used for photographic paper as well as for film.

The roll of film or paper need not necessarily be supported on hub means which make part of the end cap, but the hub means may also be in the form of separate panels that are provided with a centrally projecting hub member, and that are placed in the cassette between the end walls and the roll of photographic material. In such case the end caps may have a simpler form, and the cassette may even entirely be manufactured from cardboard. Also in such case, the distance a should be taken between the inside surfaces of such panels. An example of the discribed hub means is disclosed in Research Disclosure 14131 of Jan 76, entitled: "Dispensing cassette for a photosensitive web".

The roll of film or paper may also take an asymmetric position in the cassette. For instance, a roll of a size as illustrated in FIG. 3 may be provided on one end with an extension member of a size approximately as that illustrated in FIG. 2. The journalling of such roller thus occurs at one end by contact of its proper core with one hub of the cassette, and at the other end by contact of the extension member with the other hub.

We claim:

1. A light-tight cassette for holding and dispensing a roll of light-sensitive material wound onto a core, said cassette being in the form of a box comprising a tubular shell with two end closure walls, hub means projecting internally from said closure walls for rotatably supporting said roll within the box, said shell having a light-tight peripheral exit slot through which light-sensitive material can pass from the interior to the exterior of the box, the material in said roll having a width smaller than the distance between the inside surfaces of the end closure walls and being wound upon a hollow cylinder supporting the wound roll and of a length generally equal to the material width, and at least one end of the cylinder a separate extension member that is engaged in the hollow interior of the corresponding cylinder end, said member having an axially projecting free end rotatably supported on the hub means of the corresponding end wall, and an integral radial flange spaced from said free end for laterally supporting the corresponding end of the roll of light-sensitive material, any cylinder end not engaged by such extension member having its hollow interior rotatably supported on the hub means of the other end wall.

2. A light-tight cassette according to claim 1, wherein the cylinder is engaged at each of its ends with such extension member, and each said extension member has its free end rotatably supported on the hub means of the corresponding end closure wall.

3. A light-tight cassette according to claim 1, wherein each such extension member has an end section opposite said free end that fits in telescoping relation in the interior of one end of the cylinder of the roll of light-sensitive material.

4. A light-tight cassette according to claim 3, wherein the extension member is in the form of a generally cylindrical member with two sections of different diameters, the outer diameter $d_o$ of one section being dimensioned such as to insure a frictional fit in the interior of the cylinder, and the inner diameter $d_i$ of the other section corresponding with the inner diameter of the cylinder and being adapted to be rotatably supported on said hub means.

5. A light-tight cassette according to claim 4, wherein the outer peripheral surface of the one section is provided with shallow axial ribs and said cylinder is formed of yieldable material for engagement by said ribs.

6. A light-tight cassette according to claim 4, wherein the inner peripheral surface of the second section is provided with axial grooves for receiving the ends of a radial locking pin passing through the hub means of the corresponding end closure wall.

7. A light-tight cassette according to claim 4, wherein said axial flange is located at the junction of the two sections of said extension member.

* * * * *

UNITED STATES PATENT AND TRADEMARK OFFICE
CERTIFICATE OF CORRECTION

PATENT NO. : 4,834,236
DATED : May 30, 1989
INVENTOR(S) : Edward Buelens et al

It is certified that error appears in the above-identified patent and that said Letters Patent is hereby corrected as shown below:

In the Heading:

Item [30] Foreign Application Priority Data, the date should read -- Sept. 5, 1986 --.

In the Claims:

Claim 1, column 5, line 37, "at least" should read -- at at least --.

Signed and Sealed this

Twenty-seventh Day of March, 1990

Attest:

JEFFREY M. SAMUELS

*Attesting Officer*   *Acting Commissioner of Patents and Trademarks*